United States Patent [19]

Mattos

[11] 4,077,270
[45] Mar. 7, 1978

[54] LOCKING, SANITARY HUB

[76] Inventor: David W. Mattos, 1501 Stone Creek Dr., San Jose, Calif. 94123

[21] Appl. No.: 767,361

[22] Filed: Feb. 10, 1977

[51] Int. Cl.² .............................................. F16H 7/22
[52] U.S. Cl. .................................................. 74/230.4
[58] Field of Search ................... 74/230.4, 434, 230.3, 74/230.8

[56] References Cited

U.S. PATENT DOCUMENTS

| 3,190,134 | 6/1965 | Sadler et al. | 74/230.4 |
| 3,424,019 | 1/1969 | Wolfram | 74/230.4 |

Primary Examiner—Leonard H. Gerin
Attorney, Agent, or Firm—Limbach, Limbach & Sutton

[57] ABSTRACT

A hub for mounting on different sized sanitary machinery shafts and which has a cylindrical housing, at least one end of the housing having a cylindrical opening which is concentric with the longitudinal axis of the shaft and a cylindrical hub mounted within the housing opening and sealed around its circumference to the opening, the hub having a bore therein to accommodate the shaft, and, in some embodiments, a bushing mounted within the bore to allow the hub to be adapted to different sized shafts. A closure ring is fitted within a counter-bore in the hub, the closure ring and the counter-bore both being eccentric with respect to the longitudinal axis of the shaft so that counter-rotation of the closure ring with respect to the hub causes the closure ring to jam fit within the counter-bore of the hub and effect a liquid tight seal as well as preventing the hub from moving longitudinally along the shaft.

12 Claims, 3 Drawing Figures

LOCKING, SANITARY HUB

BACKGROUND OF THE INVENTION

In the materials handling industry, conveyor belts and conveyor belt systems are well known and it is desirable to make such systems easy to disassemble and reassemble to accommodate different processing operations. In the food handling industry, however, the sanitary conditions imposed by the various governmental agencies are so strict, that it is often difficult to design sanitary conveyor belt systems which are readily disassemblable. This is because such sanitary regulations ordinarily require that there be no horizontal surfaces on which foreign particles such as food, grease, or water, may collect and no openings or voids into which liquids may seep and collect to breed bacteria.

As an example of this problem, consider conveyor belt pulleys for sanitary conveyors. The conveyor pulleys at both ends have a hub which allows the conveyor pulley to be mounted on a rotatable shaft. The sanitary regulations require that there be no opening between the housing of the conveyor belt pulley and the shaft into which liquid may seep and collect within the pulley housing to breed bacteria which might contaminate the food being processed. Thus, one solution to this problem has been, in the past, to simply weld the end of the pulley to the shaft to provide a liquid tight seal. One difficulty with this approach is that the pulley is thus unable to accommodate a different sized conveyor shaft. Also, to remove the pulley from the conveyor belt requires that the entire shaft and pulley housing be removed as one unit rather than simply by pulling the shaft out of the pulley housing.

SUMMARY OF THE INVENTION

The above and other disadvantages of prior art sanitary hub assemblies are overcome by the present invention of a hub for mounting on a sanitary machinery shaft including a cylindrical housing, at least one end of the housing having a cylindrical opening concentric with the longitudinal axis of the housing, a cylindrical hub mounted within the housing opening, and with the other circumference of the hub being integrally attached at all points such as by welding to the lip of the housing opening to effect a seal therewith. The hub has a bore therein to accommodate the shaft and an enlarged diameter counter-bore portion located at the end of the bore which is proximate to the housing opening for receiving a flush fitting closure ring. The closure ring and the counter-bore are eccentric with respect to the rotational axis of the hub. This construction allows the closure ring to be counter-rotated with respect to the hub to effect a liquid tight, jam-fit which closes off the open end of the hub exterior to the housing and thereby effects the liquid tight seal between the housing and the machinery shaft.

In one preferred embodiment, the hub also contains a bushing which is mounted within the hub bore to allow the hub bore to accommodate different sized shafts simply by selecting a bushing of the proper dimensions. The bushing is held within the hub bore at one end by the jam-fitted closure ring and at the other end by a resilient spring clip which seats within a groove within the hub bore. In some embodiments, however, the hub has the closure ring configuration at both ends. This is especially desirable where both ends of the hub are exposed to the food processing operation. In the usual embodiments of the invention, the housing has either of these hub configurations at both ends, depending on the length of the housing.

To prevent relative rotation between the shaft and the hub, the hub is keyed to the shaft, either directly, or, in the embodiment having a bushing, the hub is keyed to the bushing which is keyed to the shaft.

Although this invention finds immediate application for mounting sanitary conveyor belt pulleys on rotatable shafts, it is also suitable for mounting other sanitary machinery parts, such as gears, sprockets, fly wheels, clutches, and levers, on sanitary machinery shafts, whether rotatable or not.

It is therefore an object of the present invention to provide a sanitary mounting assembly for a hub on a sanitary machinery shaft.

It is another object of the invention to provide a liquid tight seal for a shaft mounted hub in a sanitary machinery system.

It is still another object of the present invention to provide a sanitary machinery mounting hub which accommodates different sized sanitary machinery shafts.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
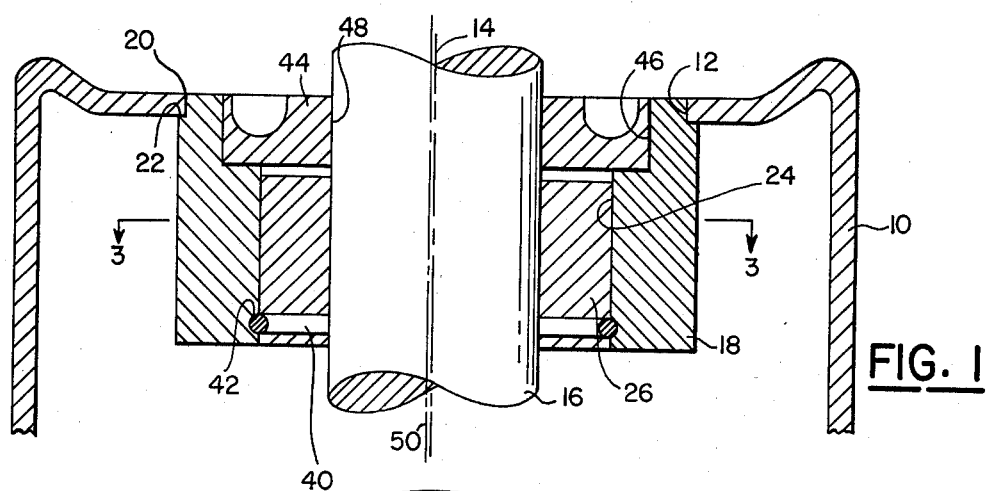
FIG. 1 is a vertical view, partly in section and partly in elevation of a preferred embodiment of the invention.

Referring now more particularly to FIG. 1, one embodiment of the invention in the form of a sanitary pulley hub for a sanitary conveyor belt system will be described as exemplary of the other numerous embodiments of the invention. The pulley housing 10 of the invention is a hollow cylinder having a cylindrical opening 12 at each end. This opening 12 is concentric with the rotational axis 14 of the pulley housing 10. The opening 12 allows the conveyor belt shaft 16 to be inserted within the housing 10.

In order to mount the housing 10 on the shaft 16, a cylindrical hub 18 is integrally attached around one of its circumferential edges to the opening 12 to effect a seal 20 between the exterior surface of the hub 18 and the interior lip of the opening 12 of the housing 10. This seal 20 is ordinarily accomplished either by brazing or welding. In some embodiments, the lip of the opening 12 seats in a shoulder 22 in this outer circumferential edge of the hub 18. The hub 18 is concentric with the housing 10 about the rotational axis 14.

The hub 18 has a bore 24 which is of a diameter larger than the diameter of the shaft 16. In the preferred embodiment in order to take up the spacing between the interior surface of the bore 24 and the exterior surface of the shaft 16, a bushing 26 is fitted within the bore 24 and is dimensioned so as to fill the space between the exterior surface of the shaft 16 and the interior surface of the bore 24.

Figure 3:
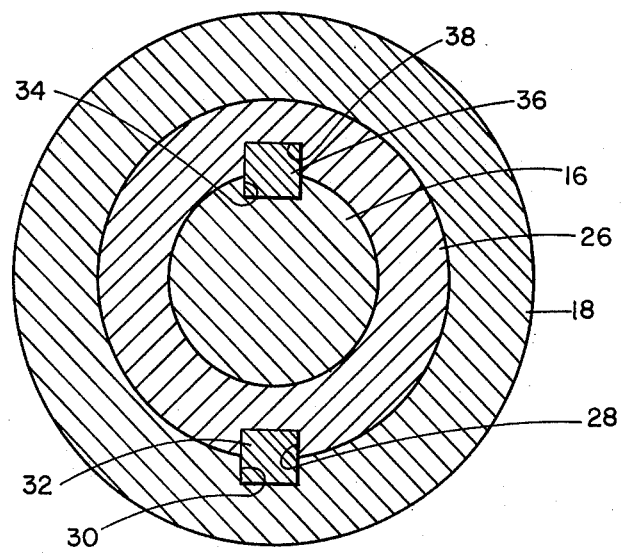
FIG. 3 is a vertical, sectional view taken generally along the line 3—3 in FIG. 1.

Referring now more particularly to FIGS. 1 and 3, in order to key the shaft 16 to the hub 18, a pair of radially aligned, longitudinal grooves are cut in the bushing 26 and the hub 18 and separate keys are fitted therein. Thus, the bushing 26 is provided with a longitudinal groove 28 which is radially aligned with a longitudinal groove 30 in the hub 18. A key, that is a flat strip 32, is inserted into both the grooves 28 and 30 to lock the bushing 26 to the hub 18. Similarly, a longitudinal groove 34 in the shaft 16 receives a flat key 36 which is also seated within a radially aligned longitudinal groove 38 in the bushing 26 to lock the shaft 16 to the bushing 26.

A retaining clip ring 40 is carried within a groove 42 in the bore 24 to prevent the bushing 26 from sliding out of the end of the hub 18 which is interior to the housing 10.

The pulley housing 10 is prevented from sliding longitudinally along the shaft 16 by means of a closure ring 44 which is flush seated within an enlarged diameter counter-bore portion 46 of the bore 24 in the hub 18. The closure ring has a bore 48 therein which accommodates the shaft 16. Both the closure ring bore 48 and the counter-bore 46 are eccentric with respect to the rotational axis 14. Thus, the bore 48 and the counter-bore 46 are concentric about an axis 50 which is parallel to the axis 14 but which is displaced from it.

Figure 2:
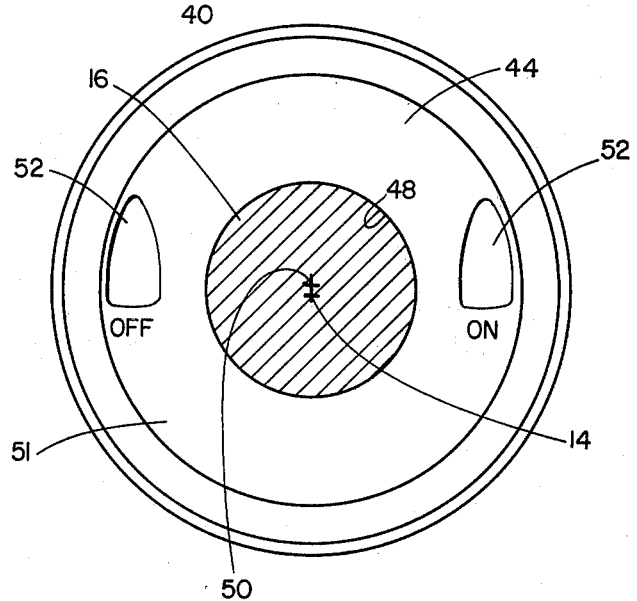
FIG. 2 is an end vertical view in elevation of the closure ring of the embodiment depicted in FIG. 1.

As best seen in FIG. 2, the closure ring 44 has a planar surface 51 which is exterior to the housing 10 and is flush with the exposed end of the hub 18. A pair of diagonally opposed indentations 52 in the planar surface 51 aid in rotating the closure ring 44 about the shaft 16 and more particularly in counter-rotating the closure ring with respect with the hub 18. When the closure ring 44 is counter-rotated with respect to the hub 18, it jam-fits within the counter-bore 46 to effect a liquid tight, sanitary seal between the hub 18 and the shaft 16. It also prevents the pulley hub 10 from translating longitudinally along the shaft 16. The reason that this liquid tight seal is effected is that the tolerances in the dimensions between the exterior circumferential surface of the closure ring 44 and the interior surface of the counter-bore 46 and between the exterior surface of the shaft 16 and the interior surface of the closure ring bore 48 are so close that upon the jam-fit produced by the counter-rotation of the various members they deform elastically to fit tightly against each other to prevent the passage of liquid therebetween.

In the preferred embodiment the bushing 26 is illustrated for adapting the hub 18 to different sized shafts simply by changing the bushing 26 and the closure ring 44 to different parts having different dimensions to accommodate the different sized shaft. It should be understood, however, that in less advantageous embodiments of the invention, the bushing 26 may be omitted entirely and the bore 24 may be dimensioned to fit closely about the exterior surface of the shaft 16 and to be keyed to it. The keying feature is desirable to prevent the closure ring 44 from being loosened by rotation of the shaft 16.

In addition to sealing the opening of the hub 18 which is exterior to the housing 10, the closure ring 44 also captures the bushing 26 against the retaining ring 40 to prevent it from sliding out of the outside end of the bore 24 of the hub 18.

In other embodiments, the retaining ring assembly is replaced with a second closure ring fitted in a counter-bore in the hub.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A pulley hub for mounting on a rotatable sanitary conveyor shaft comprising a cylindrical pulley housing having a rotational axis coincident with the rotational axis of the shaft, at least one end of the housing having a cylindrical opening concentric with the rotational axis of the housing, a cylindrical hub for attaching the housing to the shaft, the outer circumference of the hub being sealed to the lip of the housing opening, the hub having an axial bore therethrough to accommodate the shaft and having a counter-bore at one end which opens toward the exterior of the housing, a closure ring having an outer diameter slightly less than the diameter of the hub counter-bore such that the closure ring seats snugly within the counter-bore, the closure ring further having a bore to snugly accommodate the shaft, and wherein the closure ring bore and the hub counter-bore are eccentric to the rotational axis such that counter-rotation of the closure ring with respect to the hub counter-bore in which it is seated jams the outer circumferential surface of the closure ring against the inner, annular surface of the counter-bore to effect a complete liquid tight seal between the surface of the shaft and the housing opening.

2. A pulley hub for mounting on a rotatable sanitary conveyor shaft as recited in claim 1 further comprising means to key the hub to the shaft to prevent rotation of the hub relative to the shaft.

3. A pulley hub for mounting on a sanitary conveyor shaft as recited in claim 1 wherein the pulley housing has cylindrical openings at both ends and is sealed to the shaft at both ends by means of separate pairs of hubs and corresponding closure rings.

4. A pulley hub for mounting on a sanitary conveyor shaft as recited in claim 1 wherein the closure ring has a planar surface which is exterior to the hub counter-bore, the planar surface having a pair of diagonally spaced apart indentations to facilitate the counter-rotation of the closure ring with respect to the hub.

5. A pulley hub for mounting on a rotatable sanitary conveyor shaft comprising a cylindrical pulley housing, at least one end of the housing having a cylindrical opening concentric with the rotational axis of the housing, a cylindrical hub mounted within the housing opening, the outer circumference of the hub being integrally attached at all points to the lip of the housing opening to effect a seal therewith, the hub having a bore therein and an enlarged diameter counter-bore portion located proximate to the housing opening and being eccentric to the rotational axis of the hub, a bushing mounted within the hub bore, the bushing having a bore which is concentric with the hub bore and having a diameter sufficient to slidably fit over the shaft, the exterior diameter of the bushing being slightly less than the diameter of the hub bore such that the bushing fits snugly inside of the hub bore, means for stopping the bushing from passing out of the end of the hub bore which is opposite from the housing opening, and a closure ring mounted snugly within the enlarged diameter counter-bore portion of the hub bore, the closure ring having a bore whose diameter is slightly larger than the diameter of the shaft and which is eccentric to the rotational axis of the closure ring, such that when the hub and the closure ring are counter-rotated with respect to each other they produce a liquid tight, jam-fit which completes the sealing of the housing opening and prevents the hub and pulley housing from sliding longitudinally on the shaft.

6. A pulley hub for mounting on a sanitary conveyor shaft as recited in claim 5 further comprising means for keying the spacer ring to the shaft and to the hub.

7. A pulley hub for mounting on a sanitary conveyor shaft as recited in claim 5 wherein the closure ring seats against the spacer ring when fully inserted into the counter-bore of the hub and, together with the spacer ring stopping means, prevents axial movement of the spacer ring within the hub bore when the closure ring and the hub are jam-fitted together.

8. A hub for mounting sanitary machinery member on a sanitary machinery shaft comprising a cylindrical hub for attaching the member to the shaft, the outer circumference of the hub being sealed flush with one surface of the member, the hub having an axial bore therethrough to accommodate the shaft and having a counter-bore at one end, a closure ring having an outer diameter slightly less than the diameter of the hub counter-bore such that the closure ring seats flush and snugly within the counter-bore, the closure ring further having a bore to snugly accommodate the shaft, and wherein the closure ring bore and the hub counter-bore are eccentric to a common hypothetical rotational axis of the closure ring and hub such that counter-rotation of the closure ring with respect to the hub counter-bore in which it is seated jams the outer circumferential surface of the closure ring against the inner, annular surface of the counter-bore to effect a complete liquid tight seal between the surface of the shaft and the one surface of the member.

9. A hub for mounting a sanitary machinery member on a sanitary machinery shaft as recited in claim 8 further comprising means to key the hub to the shaft to prevent rotation of the hub relative to the shaft.

10. A hub for mounting a cylindrical member, having a hypothetical axis of rotation, on a sanitary shaft, wherein at least one end of the member has a cylindrical opening concentric with the rotational axis of the member, a cylindrical hub mounted within the opening of the member, the outer circumference of the hub being integrally attached at all points to the lip of the opening to effect a seal therewith, the hub having a bore therein and an enlarged diameter counter-bore portion located proximate to the opening and being eccentric to the rotational axis of the hub, a bushing mounted within the hub bore, the bushing having a bore which is concentric with the hub bore and having a diameter sufficient to slidably fit over the shaft, the exterior diameter of the bushing being slightly less than the diameter of the hub bore such that the bushing fits snugly inside the hub bore, means for stopping the bushing from passing out of the end of the hub bore which is opposite from the opening of the member, and a closure ring mounted flush and snugly within the enlarged diameter counter-bore portion of the hub bore, the closure ring having a bore whose diameter is slightly larger than the diameter of the shaft and which is eccentric to the rotational axis of the closure ring, such that when the hub and the closure ring are counter-rotated with respect to each other they produce a liquid tight, jam-fit which completes the sealing of the opening of the member and prevents the hub and member from sliding longitudinally on the shaft.

11. A hub for mounting a member on a sanitary machinery shaft as recited in claim 10 further comprising means for keying the spacer ring to the shaft and to the hub.

12. A hub for mounting a member on a sanitary machinery shaft as recited in claim 10 wherein the closure ring seats against the spacer ring when fully inserted into the counterbore of the hub and, together with the spacer ring stopping means, prevents axial movement of the spacer ring within the hub bore when the closure ring and the hub are jam-fitted together.

* * * * *